United States Patent [19]

Inami et al.

[11] Patent Number: 4,899,593
[45] Date of Patent: Feb. 13, 1990

[54] ELECTRODE STRUCTURE FOR ELECTROMAGNETIC FLOWMETER

[75] Inventors: Toshihide Inami; Tsutomu Goto, both of Tokyo, Japan

[73] Assignee: Yamatake-Honeywell Co., Ltd., Tokyo, Japan

[21] Appl. No.: 320,347

[22] Filed: Mar. 8, 1989

[30] Foreign Application Priority Data

Mar. 17, 1988 [JP] Japan .................................. 63-61984

[51] Int. Cl.$^4$ ............................................... G01F 1/58
[52] U.S. Cl. .................................................. 73/861.12
[58] Field of Search ....................................... 73/861.12

[56] References Cited

U.S. PATENT DOCUMENTS

| | | | |
|---|---|---|---|
| 3,486,376 | 12/1969 | Wada ................................. | 73/861.12 |
| 3,695,104 | 10/1972 | Mannherz et al. ............... | 73/861.12 |
| 4,773,275 | 9/1988 | Kalinoski .......................... | 73/861.12 |

FOREIGN PATENT DOCUMENTS 59-183621 12/1984 Japan .

Primary Examiner—Charles A. Ruehl
Attorney, Agent, or Firm—Townsend & Townsend

[57] ABSTRACT

An electrode structure for an electromagnetic flowmeter includes a ceramic measuring pipe, an insertion electrode, a press member, and inner and outer gaskets. The electrode has a large-diameter liquid contact end exposed inside the ceramic measuring pipe and an electrode shaft inserted into the electrode insertion hole from the inside of the ceramic measuring pipe. The press member is fitted on the electrode shaft extending outside the ceramic measuring pipe and opposes the electrode liquid contact end through the wall of the ceramic measuring pipe. The press member has a groove adjacent to the insertion electrode on a side which is in contact with the outer surface of the ceramic measuring pipe. The groove is defined by a tapered surface whose diameter is increased toward the ceramic measuring pipe. The inner gasket contacts a surface of the electrode liquid contact end which is in contact with the inner wall surface of the ceramic measuring pipe. The outer gasket is fitted in a space defined by the groove of the press member, the outer surface of the ceramic measuring pipe, and the insertion electrode in the groove so as to be urged against the outer surface of the ceramic measuring pipe. Points of forces acting on the inner and outer surfaces of the ceramic measuring pipe are substantially aligned with each other when the inner and outer gaskets are fastened.

3 Claims, 2 Drawing Sheets

ELECTRODE STRUCTURE FOR ELECTROMAGNETIC FLOWMETER

BACKGROUND OF THE INVENTION

The present invention relates to an electromagnetic flowmeter in which a measuring pipe is made of a ceramic material and, more particularly, to an improvement of its electrode structure.

A conventional electromagnetic flowmeter utilizes a Faraday's law of electromagnetic induction and converts a flow rate of a conductive fluid which passes through a measuring pipe into an electrical signal. Conventional electromagnetic flowmeters having various structures are available. For example, a typical measuring pipe of an electromagnetic flowmeter of this type is a stainless steel pipe in which an insulating lining is formed on its inner surface. In recent years, a ceramic measuring pipe made of alumina ($Al_2O_3$) serving as a nonconductive material is developed and popular due to advantages in which the pipe has corrosion and abrasion resistance and is not deformed at high temperatures.

A conventional electromagnetic flowmeter using this ceramic measuring pipe employs an insertion type electrode structure mounted in a measuring pipe such that liquid contact ends are exposed inside the measuring pipe. An electrode having a large-diameter liquid contact end exposed in the measuring pipe is inserted in a corresponding electrode insertion hole formed in a wall of the measuring pipe from the inside of the measuring pipe. An electrode shaft portion extending outside the measuring pipe is held outside the measuring pipe by means of a proper press member, a spring and the like.

However, in the conventional electrode structure wherein the insertion electrodes are fixed to the ceramic measuring pipe having the above arrangement, when an electrode is inserted from the inside of the measuring pipe and is fastened and fixed by the distal end portion of the electrode shaft portion with a press member, a spring, or the like, the wall portion of the measuring pipe is overloaded to undesirably damage the measuring pipe.

The present inventors made extensive studies to prevent this drawback. The present inventors found that the measuring pipe was damaged by a bending force and a tensile load acting on the wall portion of the measuring pipe due to a position difference between a force acting on the measuring pipe from the electrode liquid contact end inside the measuring pipe and an external force exerted by the above-mentioned press member or the like when the insertion electrodes are fastened and fixed on the outer side of the measuring pipe.

A ceramic material as a measuring pipe material has its mechanical properties such that it can withstand a compression load but cannot withstand a tensile load. For example, the strength of alumina or the like against the compression load is 200 $kgf/mm^2$, while its flexural strength (about 1.7 times the tensile strength) is 300 $kgf/mm^2$. Therefore, when the electrodes are fastened and fixed to obtain the electrode structure described above and the inner and outer points of forces with respect to the measuring pipe are offset from each other, a tensile load acts on the measuring pipe, thus damaging the measuring pipe. Strong demand has arisen for an electrode structure for solving the above problem. In particular, in this electrode mounting portion, liquid leakage or the like must be perfectly prevented, and the liquid contact end must be firmly connected to the press member. Therefore, a structure which can reduce the tensile load described above is required. In order to prevent the tensile load from acting on the measuring pipe, a point of force acting on each electrode liquid contact end inside the measuring pipe must be aligned with a point of force acting on the press member or the like attached to the corresponding electrode shaft portion outside the measuring pipe. However, high precision is required to arrange the respective parts so as to coincide the points of force with each other. In practice, a countermeasure for solving all these problems with a simple structure is desired.

In addition, a seal material such as a gasket must be fitted on each electrode mounting portion of the measuring pipe to assure perfect sealing.

SUMMARY OF THE INVENTION

It is a principal object of the present invention to provide an electrode structure for an electromagnetic flowmeter wherein a ceramic measuring pipe is not easily damaged.

It is another object of the present invention to provide an electrode structure for an electromagnetic flowmeter wherein perfect sealing at each electrode mounting portion is assured.

In order to achieve the above objects of the present invention, there is provided an electrode structure for an electromagnetic flowmeter, comprising a ceramic measuring pipe having an electrode insertion hole in a wall thereof, an insertion electrode having a large-diameter liquid contact end exposed inside the ceramic measuring pipe and an electrode shaft inserted into the electrode insertion hole from the inside of the ceramic measuring pipe, a press member fitted on the electrode shaft extending outside the ceramic measuring pipe and which opposes the electrode liquid contact end through the wall of the ceramic measuring pipe, the press member having a groove provided adjacent to the insertion electrode on a side which is in contact with an outer surface of the ceramic measuring pipe, the groove being defined by a tapered surface whose diameter is increased toward the ceramic measuring pipe, an inner gasket contacting a surface of the electrode liquid contact end which is in contact with an inner wall surface of the ceramic measuring pipe, and an outer gasket fitted in a space defined by the groove of the press member, the outer surface of the ceramic measuring pipe, and the insertion electrode in the groove so as to be urged against the outer surface of the ceramic measuring pipe, wherein points of forces acting on the inner and outer surfaces of the ceramic measuring pipe are substantially aligned with each other when the inner and outer gaskets are fastened.

According to the present invention, the electrode shaft portion having inner gaskets on inner surfaces of large-diameter liquid contact ends is inserted into the corresponding electrode insertion hole from the inside of the measuring pipe. The electrode shaft portion is inserted into the electrode insertion hole through an outer gasket which is fitted in tapered grooves, respectively. The electrode shaft portion and the press member are fastened by nuts or the like, respectively. Therefore, the point of force acting on the inner wall surface of the measuring pipe can be almost aligned with the point of force acting on the outer wall surface of the measuring pipe, thereby preventing damage to the ceramic measuring pipe and assuring perfect sealing by double sealing.

DESCRIPTION OF THE PREFERRED EMBODIMENT

Figure 1:
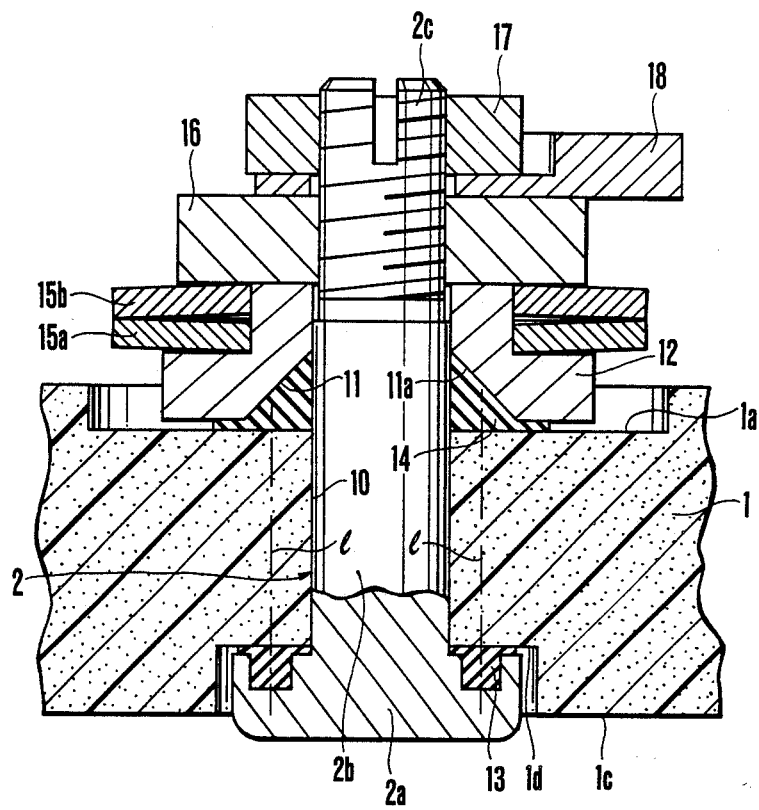
FIG. 1 is an enlarged sectional view showing a main part of an electrode mounting portion of an electrode structure of a measuring pipe for an electromagnetic flowmeter according to an embodiment of the present invention.
Figure 2:
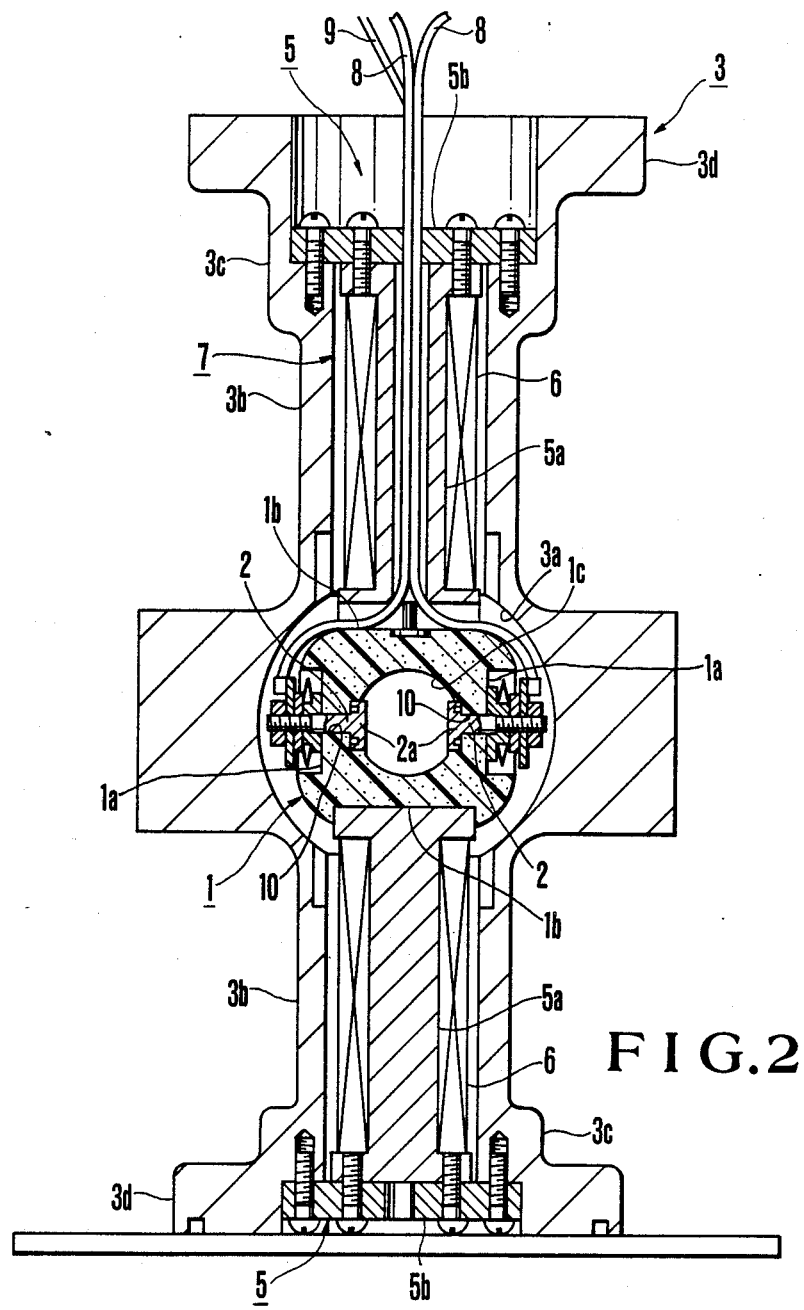
FIG. 2 is a schematic sectional view showing the overall structure of an electromagnetic flowmeter which employs the present invention.

FIGS. 1 and 2 show an electromagnetic flowmeter according to an embodiment of the present invention. Referring to FIGS. 1 and 2, reference numeral 1 denotes a substantially cylindrical measuring pipe made of a ceramic material such as alumina ($Al_2O_3$). Fluid pipes (not shown) through which a fluid flows can be connected to both ends of the measuring pipe 1.

An arrangement of the electromagnetic flowmeter detecting unit using the ceramic measuring pipe 1 will be briefly described with reference to FIG. 2. A peripheral portion of the measuring pipe 1 is divided into portions at equal angular intervals. A pair of opposite square or circular electrode mounting surfaces 1a and a pair of coil mounting recesses 1b are arranged at 90° angular intervals. A pair of electrodes 2 are inserted and fixed in electrode insertion holes 10 (to be described later) formed in the opposite electrode mounting surfaces 1a, respectively. Liquid contact ends 2a of the electrodes 2 are in contact with a fluid which flows in an inner hole 1c of the measuring pipe, as is also apparent from FIG. 1.

Reference numeral 3 denotes a metal instrument case (instrument main body) for housing the measuring pipe 1 in a central hole 3a. The metal instrument case 3 fixes both end flanges (not shown) of the measuring pipe 1 and is supported by and fixed to a base or the like of a process side (not shown). O-rings serving as seal members are mounted on the outer peripheral surfaces of both ends of the measuring pipe 1 which serve as fitting surfaces for the case 3, thereby assuring sealing at the fitting portions. A pair of rectangularly cylindrical portions 3b are formed in the case 3 at positions respectively corresponding to the recesses 1b. Flanges 3d are formed at distal end portions of the cylindrical portions 3b through cylindrical portions 3c, respectively. Coil bobbins 5 consisting of tubular bobbin bodies 5a at both ends of the flanges and discs 5b fixed at outer ends of the bobbin main bodies 5a by screws, and coil units 7 constituted by excitation coils 6 wound around the coil bobbins 5 are housed in the corresponding rectangularly cylindrical portions 3b. When the discs 5b of the coil bobbins 5 are fixed on stepped portions of the case 3, the coil units 7 are fixed on the case 3. Therefore, the pair of upper and lower coil units 7 interpose the measuring pipe therebetween to fix the case 3 and the measuring pipe 1. Lead wires 8 connected to the electrodes 2 are led to a terminal box or converter (neither are shown) through holes of the coil bobbins 5. Lead wires 9 connected to the excitation coils 6 are connected to a power source (not shown) through holes of the discs 5b.

According to the present invention, as shown in FIG. 1, the electromagnetic flowmeter having the above arrangement comprises insertion electrodes 2 having large-diameter liquid contact ends 2a and electrode shafts 2b inserted into electrode insertion holes 10 in the wall portions of a measuring pipe 1 from the inside of the measuring pipe 1, and a press member 12 fitted on the electrode shafts 2b outside the measuring pipe 1 and having grooves 11 defined by tapered surfaces 11a whose diameter is increased toward the measuring pipe. Annular inner gaskets 13 having a rectangular cross section are mounted in contact with liquid contact end 2a surfaces (recesses 1d formed on an inner hole 1c side opposite to the electrode mounting surfaces 1a) contacting the inner measuring pipe wall surface. Annular (conical shape with an axial hole) outer gaskets 14 having a triangular cross section are fitted in spaces formed by the groove of the press members 12, the electrode shafts 2b in the grooves 11, and the outer surface of the ceramic measuring pipe 1 and are urged against the wall portions (electrode mounting surfaces 1a) of the measuring pipe 1. When the inner and outer gaskets 13 and 14 are fastened, the points of forces acting on the surfaces (parts of 1a and 1d) contacting corresponding inner and outer gaskets are almost aligned with each other, as indicated by reference symbol l in FIG. 1.

Reference numerals 15a and 15b denote a pair of Belleville springs mounted on the outer small-diameter portion of each press member 12; reference numeral 16, a nut threadably engaged with a male thread portion 2c as a distal end portion of each electrode shaft 2b for fixing the corresponding press member to the measuring pipe 1 through the Belleville springs 15a and 15b; and 17, a nut for fixing a terminal 18 connected to electrode lead wires (denoted by reference numeral 8 in FIG. 2) at an outer end of the nut 17. The inner and outer gaskets 13 and 14 are made of Teflon. Each outer gasket 14 has an annular shape having a triangular cross section. The outer surface of the measuring pipe 1 and the peripheral surface of each electrode shaft 2b are simultaneously sealed.

With the above arrangement, each electrode shaft 2b with the corresponding inner gasket 13 mounted on the corresponding large-diameter liquid contact end 2a is inserted into the corresponding electrode insertion hole 10 from the inside of the measuring pipe 1. Each press member 12 in which the corresponding outer gasket 14 is inserted in the groove 11 defined by the tapered surface 11a is fitted on the electrode shaft 2b extending outside the measuring pipe 1 and is fastened thereto by the nut 16 or the like. At this time, the points of forces acting on the gasket abutment surfaces 1a and 1d inside and outside the measuring pipe 1 are almost aligned with each other. Therefore, damage to the ceramic measuring pipe 1 which is caused by a tensile load due to a positional error in a conventional ceramic measuring pipe can be prevented. The service life of the ceramic measuring pipe 1 can be prolonged, and the maintenance operations can be advantageously reduced. In particular, according to the present invention, the liquid contact ends 2a of the electrodes 2 and the grooves 11 defined by the tapered surfaces 11a of the press members 12 fitted on the electrode shafts 2b are positioned with respect to the electrode shafts 2b. Therefore, the points of forces acting on the inner and outer gaskets 13 and 14 can be almost aligned, thus providing a great practical advantage.

With this arrangement, since the gaskets 13 and 14 serving as double sealing members are mounted inside and outside the electrode mounting portions, leakage of a liquid through the electrode insertion holes 10 can be prevented, and perfect sealing can be assured.

The present invention is not limited to the particular embodiment described above. The shapes and structures of the respective members of the electromagnetic flowmeter can be arbitrarily changed and modified within the spirit and scope of the invention. The present invention is very effective when insertion electrodes are mounted in the ceramic measuring pipe.

The tapered surface defining the groove formed in the outer gasket need not be a linearly inclined surface but may be an arcuate surface (a ¼ circular surface).

The electromagnetic flowmeter according to the present invention as has been described above comprises insertion electrodes having the large-diameter liquid contact ends exposed inside the ceramic measuring pipe and electrode shafts inserted into the electrode insertion holes from the inside of the measuring pipe, and the press members fitted on the electrode shafts outside the measuring pipe and having grooves defined by the tapered surfaces whose diameter is increased toward the measuring pipe around the electrode shafts. The inner gaskets are mounted on the electrode liquid contact end surfaces contacting the inner wall surface of the measuring pipe, and the outer gaskets are urged against the outer wall surface of the measuring pipe and fitted in the grooves defined by the press members and the electrode shafts in the grooves. The points of forces acting on the inner and outer abutment surface portions of the measuring pipe are almost aligned with each other when the inner and outer gaskets are fastened. Although the structure is simple and inexpensive, the tensile load which damages the electrode mounting portions can be eliminated, and only the compression load acts on the electrode mounting portion, thereby preventing damage to the measuring pipe. The service life of the measuring pipe can be prolonged, and maintenance operations can be reduced. In addition, liquid leakage at the electrode mounting portions can be perfectly prevented.

What is claimed is:

1. An electrode structure for an electromagnetic flowmeter, comprising:
    a ceramic measuring pipe having an electrode insertion hole in a wall thereof;
    an insertion electrode having a large-diameter liquid contact end exposed inside said ceramic measuring pipe and an electrode shaft inserted into said electrode insertion hole from the inside of said ceramic measuring pipe;
    a press member fitted on said electrode shaft extending outside said ceramic measuring pipe and opposing said electrode liquid contact end through the wall of said ceramic measuring pipe, said press member having a groove provided adjacent to said insertion electrode on a side which is in contact with an outer surface of said ceramic measuring pipe, said groove being defined by a tapered surface whose diameter is increased toward said ceramic measuring pipe;
    an inner gasket contacting a surface of said electrode liquid contact end which is in contact with an inner wall surface of said ceramic measuring pipe; and
    an outer gasket fitted in a space defined by said groove of said press member, the outer surface of said ceramic measuring pipe, and said insertion electrode in said groove so as to be urged against the outer surface of said ceramic measuring pipe,
    wherein points of forces acting on the inner and outer surfaces of said ceramic measuring pipe are substantially aligned with each other when said inner and outer gaskets are fastened.

2. A structure according to claim 1, wherein said tapered surface is a linearly inclined surface.

3. A structure according to claim 1, wherein said inner gasket is fitted in a groove formed on a surface of said insertion electrode which contacts said liquid contact end.

* * * * *